United States Patent
van Rensburg et al.

(10) Patent No.: US 8,073,490 B2
(45) Date of Patent: Dec. 6, 2011

(54) MOBILE STATION DIRECTION FINDING BASED ON OBSERVATION OF FORWARD LINK

(75) Inventors: Cornelius van Rensburg, Dallas, TX (US); Purva R. Rajkotia, Plano, TX (US); John S. Csapo, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 10/981,813

(22) Filed: Nov. 5, 2004

(65) Prior Publication Data

US 2005/0136981 A1 Jun. 23, 2005

Related U.S. Application Data (60) Provisional application No. 60/531,498, filed on Dec. 19, 2003.

(51) Int. Cl.
*H04M 1/00* (2006.01)

(52) U.S. Cl. ...... 455/562.1; 455/561; 455/25; 455/13.3; 455/19; 455/82; 455/83; 455/63.4; 455/575.7; 375/295

(58) Field of Classification Search ............... 455/562.1, 455/432.1, 436–444, 524, 525, 561, 63.4, 455/504, 505, 506, 25, 13.3, 19, 82, 83, 575.7; 375/295

See application file for complete search history.

(56) References Cited

U.S. PATENT DOCUMENTS

| | | | |
|---|---|---|---|
| 6,073,021 A * | 6/2000 | Kumar et al. | 455/442 |
| 6,529,745 B1 * | 3/2003 | Fukagawa et al. | 455/562.1 |
| 6,671,499 B1 * | 12/2003 | Ylitalo et al. | 455/101 |
| 6,879,845 B2 * | 4/2005 | Suzuki et al. | 455/562.1 |
| 6,930,637 B2 * | 8/2005 | Brothers et al. | 342/427 |
| 7,263,385 B2 * | 8/2007 | Gurelli et al. | 455/562.1 |
| 2002/0128027 A1 * | 9/2002 | Wong et al. | 455/513 |
| 2003/0151553 A1 * | 8/2003 | Ylitalo | 342/422 |
| 2003/0224828 A1 * | 12/2003 | Ylitalo | 455/562.1 |
| 2004/0203420 A1 * | 10/2004 | Rick et al. | 455/67.11 |
| 2004/0242156 A1 * | 12/2004 | Tiirola et al. | 455/25 |

* cited by examiner

*Primary Examiner* — Patrick Edouard
*Assistant Examiner* — Shantell L Heiber (57) ABSTRACT

Beam-formed transmission from a transmitting wireless communication station to a receiving wireless communication station is supported by estimating a direction for the beamformed transmission. The receiving station reports to the transmitting station information about wide-beam and narrow-beam pilot signals that the receiving station has received from the transmitting station. The transmitting station estimates the direction of the beamformed transmission based on this information.

21 Claims, 4 Drawing Sheets

MOBILE STATION DIRECTION FINDING BASED ON OBSERVATION OF FORWARD LINK

CROSS-REFERENCE TO RELATED APPLICATION AND CLAIM OF PRIORITY

The present invention is related to that disclosed in U.S. Provisional Patent Application Ser. No. 60/531,498, filed Dec. 19, 2003, entitled "Forward Channel Beam-forming Using PSMM Value and Auxiliary Pilot Signal in a CDMA2000 Network". U.S. Provisional Patent Application Ser. No. 60/531,498 is assigned to the assignee of the present application. The subject matter disclosed in U.S. Provisional Patent Application Ser. No. 60/531,498 is hereby incorporated by reference into the present disclosure as if fully set forth herein. The present invention hereby claims priority under 35 U.S.C. §119(e) to U.S. Provisional Patent Application Ser. No. 60/531,498.

TECHNICAL FIELD OF THE INVENTION

The present invention generally relates to wireless networks and, more specifically, to a wireless networks that provide for narrow beam transmission on the forward link.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. To continue to attract new customers, wireless service providers are implementing new services, especially digital data services that, for example, enable a user to browse the Internet and to send and receive e-mail.

Many of these new services are made possible by the use of smart antenna arrays that transmit data from a base station to a mobile station using beam-forming techniques. Beam-forming focuses a transmit beam in the direction of a selected mobile station and, therefore, uses much less power than conventional transmission techniques that broadcast the data in all directions at equal strength. Moreover, since the beam is focused towards a selected mobile station, the signal power is greatly reduced in other directions, thereby reducing signal interference in other mobile stations.

However, in order to use beam-forming techniques, the direction of the mobile station must be known. A variety of conventional techniques are known for estimating the direction of a selected mobile station. In some direction-estimating devices, such as the Spatial Correlator from Metawave, the estimate is based entirely on the reverse (uplink) channel. It is then assumed that the forward (downlink) channel is similar to the reverse channel. However, it is well known that in real-world environments, this often is not true, due to reflected signals in the reverse channel. See generally, U.S. Pat. Nos. 6,108,565, 6,347,234, 6,330,460, 6,501,747, 6,233, 466, and 6,320,853 and U.S. Patent Application Serial No. 2002/0128027 A1. Another approach of the prior art proposes continuously sweeping a narrow beam over the entire sector. The mobile station must then synchronize with a narrow beam in a specific direction and transmit data after synchronization.

Unfortunately, the prior art techniques are not very accurate, since these techniques attempt to do direction finding with accuracy of up to 1 degree with a relatively wide beam width accuracy of about 15 degrees. Also, as indicated above, the prior art techniques determine the optimum forward link beam using reverse link measurements.

Therefore, there is a need in the art for improved wireless networks that are able to accurately transmit directed beams to a target mobile station. In particular, there is a need in the art for apparatuses and methods capable of accurately estimating the direction of a mobile station in order to optimize beam-forming techniques in the forward traffic channel.

SUMMARY OF THE INVENTION

The present invention overcome the shortcomings of conventional wireless networks by using wide-beam and narrow-beam pilot signals to estimate the direction to a mobile station. In an exemplary embodiment, a sweeping Auxiliary Pilot signal and forward link-based Pilot Signal Measurement Messages are used to estimate the direction to a selected mobile station. The present invention discloses that a direction finding estimate may be done directly based on the forward link channel as perceived by the mobile station and without any modification of the mobile station.

Accordingly, to address the above-discussed deficiencies of the prior art, it is a primary object of the present invention to provide, for use in a wireless network comprising a plurality of base stations capable of communicating with a plurality of mobile stations in a coverage area of the wireless network, a beam-forming apparatus associated with a first of the plurality of base stations. According to an advantageous embodiment of the present invention, the beam-forming apparatus comprises a controller capable of receiving from the first base station first information about a first pilot signal transmitted by the first base station and having a first antenna beam pattern and further capable of receiving from a first of the plurality of mobile stations second information about a second pilot signal transmitted by the first base station and having a second antenna beam pattern that is substantially narrower than the first antenna beam pattern. The controller uses the information about the first and second pilot signals to estimate a direction for a beam-formed transmission to the first mobile station.

According to one embodiment of the present invention, the first information comprises strength and phase measurements associated with the first pilot signal and the second information comprises strength and phase measurements associated with the second pilot signal.

According to another embodiment of the present invention, the strength and phase measurements associated with the second pilot signal are measured in the first mobile station and transmitted to the first base station.

According to still another embodiment of the present invention, the first information associated with the first pilot signal comprises information associated with each of a plurality of multi-path components of the first pilot signal and wherein the controller determines a strongest of the multi-path components of the first pilot signal based on the information associated with the multi-path components.

According to yet another embodiment of the present invention, the controller compares the information about the second pilot signal to the information associated with the strongest multi-path component of the first pilot signal.

According to a further embodiment of the present invention, the first base station transmits a plurality of further pilot signals having respective antenna beam patterns that are all substantially narrower than the first antenna beam pattern, and wherein the controller receives further information about each of the further pilot signals and compares the further information about each of the further pilot signals to the information associated with the strongest multi-path component of the first pilot signal.

According to a still further embodiment of the present invention, the controller determines which of the information about the second and further pilot signals most closely matches the information associated with the strongest multi-path component of the first pilot signal.

According to a yet further embodiment of the present invention, the controller generates a beam-formed transmission from the first station to the first mobile station in a beam direction associated with one of the second and further pilot signals whose associated information most closely matches the information associated with the strongest multi-path component of the first pilot signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
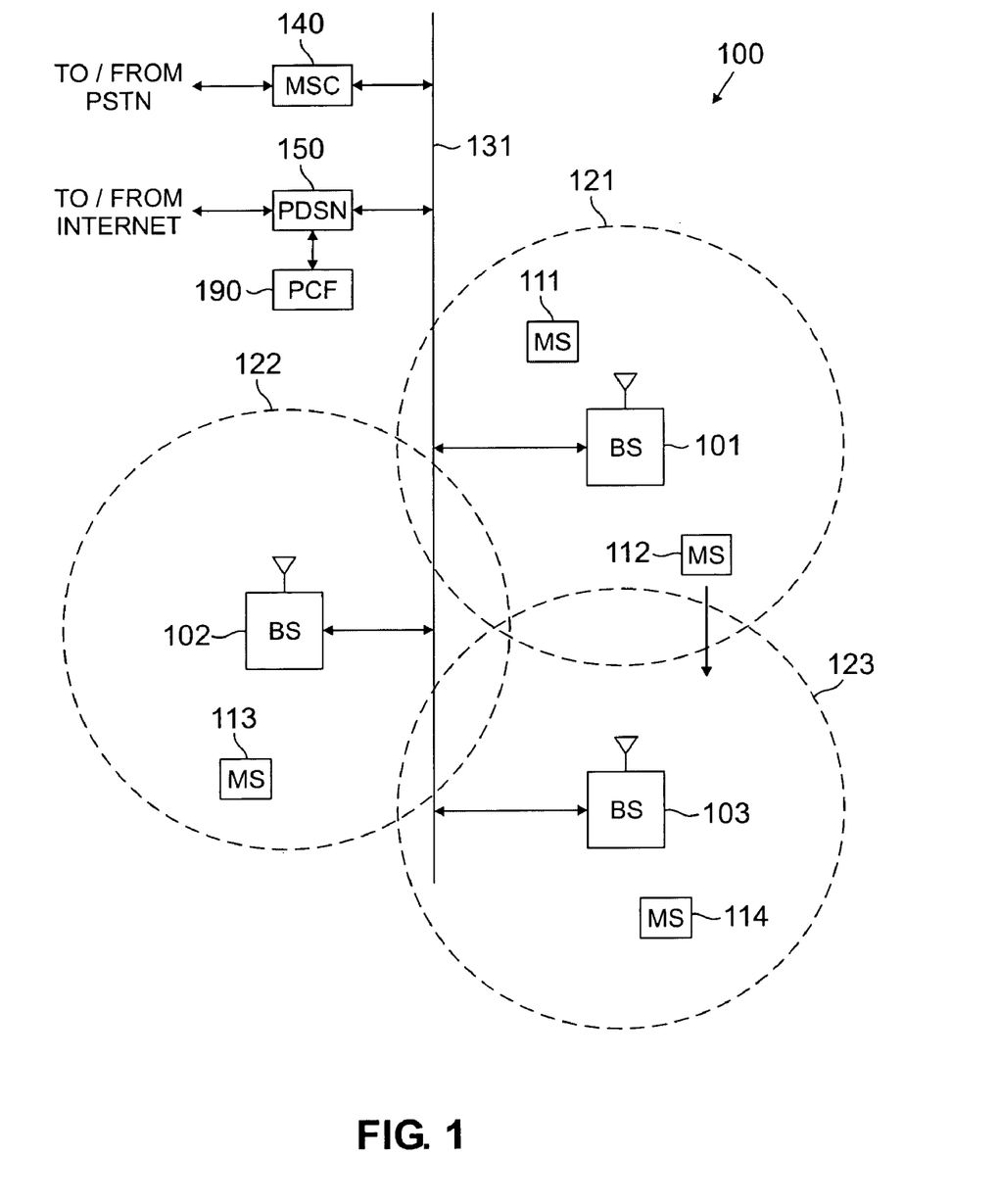
FIG. 1 illustrates an exemplary wireless network, which uses an Auxiliary Pilot (AP) channel signal to estimate the direction of a mobile station according to the principles of the present invention.

FIG. 1 illustrates exemplary wireless network 100, which uses an Auxiliary Pilot (AP) channel signal to estimate the direction of a mobile station according to the principles of the present invention. Wireless network 100 comprises a plurality of cell sites 121-123, each containing one of the base stations, BS 101, BS 102, or BS 103. In an exemplary embodiment, base stations 101-103 communicate with a plurality of mobile stations (MS) 111-114 over code division multiple access (CDMA) channels according to the cmda standards (e.g:.IS-95, Rel.0, Rel. A, Rel. B, Release C, Rel. D of cdma2000). Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass the exemplary types of mobile stations described above, as well as portable devices such as, for example, vehicle-mounted wireless devices.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments of the present invention may position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In an exemplary embodiment of the present invention, communications line 131 may be several different data links where each data link couples one of BS 101, BS 102 or BS 103 to MSC 140.

In the embodiment of wireless network 100 shown in FIG. 1, MS 111 and MS 112 are located in cell site 121 and communicate with BS 101. MS 113 is located in cell site 122 and communicates with BS 102 and MS 114 is located in cell site 123 and communicates with BS 103. MS 112 is located close to the edge of cell site 123 and moves in the direction of cell site 123, as indicated by the direction arrow proximate MS 112. At some point, as MS 112 moves into cell site 123 and out of cell site 121, a handoff will occur.

As is well known to those skilled in the art, the handoff procedure transfers control of a call from a first cell to a second cell. A handoff may be either a soft handoff or a hard handoff. In a soft handoff, a connection is made between the mobile station and the base station in the second cell before the existing connection is broken between the mobile station and the base station in the first cell. In a hard handoff, the existing connection between the mobile station and the base station in the first cell is broken before a new connection is made between the mobile station and the base station in the second cell.

As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft handoff process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft handoff assumes the mobile station is in a voice or data call. An idle handoff is the hand-off between cell sites of a mobile station that is communicating in the control or paging channel.

A conventional CDMA2000 wireless network normally uses the auxiliary pilot (AP) channel as a phase reference for coherent demodulation in the forward channel. According to the principles of the present invention, wireless network 100 uses beam-forming techniques to transmit a sweeping Auxiliary Pilot (AP) channel signal in a sector. Each mobile station in each sector transmits multiple Pilot Signal Measurement messages (PSMMs) to the base station. Each PSMM transmitted by a given mobile station includes the received signal strength of an associated beam of the AP signal. The base station is able to match each PSMM with a transmitted beam of the AP signal. The direction of the AP signal beam that results in the strongest received signal in the mobile station determines the direction of the mobile station.

The use of the Auxiliary Pilot (AP) can be beneficial in a smart antenna base transceiver subsystem (BTS), but the gain may vary. The benefits of using the AP signal may be outweighed by the additional transmit power required for the AP signal. The present invention provides for making beneficial use of the AP channel.

In an exemplary embodiment, the AP channel signal is transmitted at a power level such that the mobile station receives the AP signal at a C/I level that is marginally above the T_ADD value to ensure that the AP signal remains in the active set. In a typical CDMA2000 network, the T_ADD value is approximately −15 dB relative to the main pilot. The PSMM message from the mobile station reports when the AP signal is in the active set.

An exemplary embodiment of the present invention provides three modes (choices) for operating the AP signal for direction finding purposes:
- Mode 1—Do not use AP signal (conventional operation).
- Mode 2—Use the AP signal at all times. The BS should force the mobile to hand off to the AP.
- Mode 3—Use the AP in switched mode. Do not hand off to the AP and instead transmit traffic on a narrow beam that is phase matched to the sector pilot channel signal.

The choice as to which mode to operate in depends on the environment. The exemplary embodiment of the present invention implements the following selection procedure:
1) Mode 1 is selected when the BS monitors many RAKE fingers with similar magnitude on the reverse link and the total transmit power associated with the use of AP is relatively large.
2) Mode 2 is selected when the BS monitors many RAKE fingers with similar magnitude on the reverse link and the total transmit power associated with the use of AP is relatively small.
3) Mode 3 is selected when few RAKE fingers are monitored on the reverse link and there is one clear dominant RAKE finger.

In the exemplary embodiment, the choice between Mode 1 and Mode 2 is made as follows:
Initial_AP_Tx_Power=Sector_Pilot_Tx_Power+ T_ADD−Narrow_BeamGain;
Total_Power_Without_AP=Current_TrafficChannel_ Power;
Total_Power_With_AP=Current_TrafficChannel_Power− Narrow_BeamGain+Initial_AP_Tx_Power In the exemplary embodiment of the present invention, Mode 2 is selected when:
Total_Power_Without_AP>Total_Power_With_AP.
Otherwise, Mode 1 is selected. This can be restated as:
Choose Mode 2 if:
0>Sector_Pilot_Tx_Power+T_ADD−2*Narrow_Beam-Gain.
Otherwise, choose Mode 1.

Conventional mobile stations measure the PILOT_STRENGTH in dB and the PILOT_PN_PHASE, which latter is the Time of Arrival (TOA) value measured in number of chips. These measurements are included in the Pilot Strength Measurement Message (PSMM). In a multi-path environment, it is unlikely that two multi-paths would arrive at the mobile station with the same strength and TOA values. These two criteria are therefore considered to uniquely identify the strongest multi-path component of that pilot signal.

The exemplary embodiment of the present invention uses the following procedure to phase match the AP signal to the sector pilot signal (Mode 3). The narrow beam that would most closely create the same multi-path as the wide beam (sector) pilot signal (as identified by the aforementioned two criteria) must be the narrow beam most similar to the wide beam in that scattering area. This narrow beam is, therefore, desirable for transmitting the traffic data. As mentioned above, the CMDA2000 standard uses the Auxiliary Pilot (AP) channel as a phase reference for coherent demodulation. However, the cost in terms of power to use a dedicated pilot for each mobile station could be prohibitive. Mode 3 therefore uses the AP with an On/Off mechanism (also referred to herein as switched mode), which is more economical in terms of transmission power.

Figure 2:
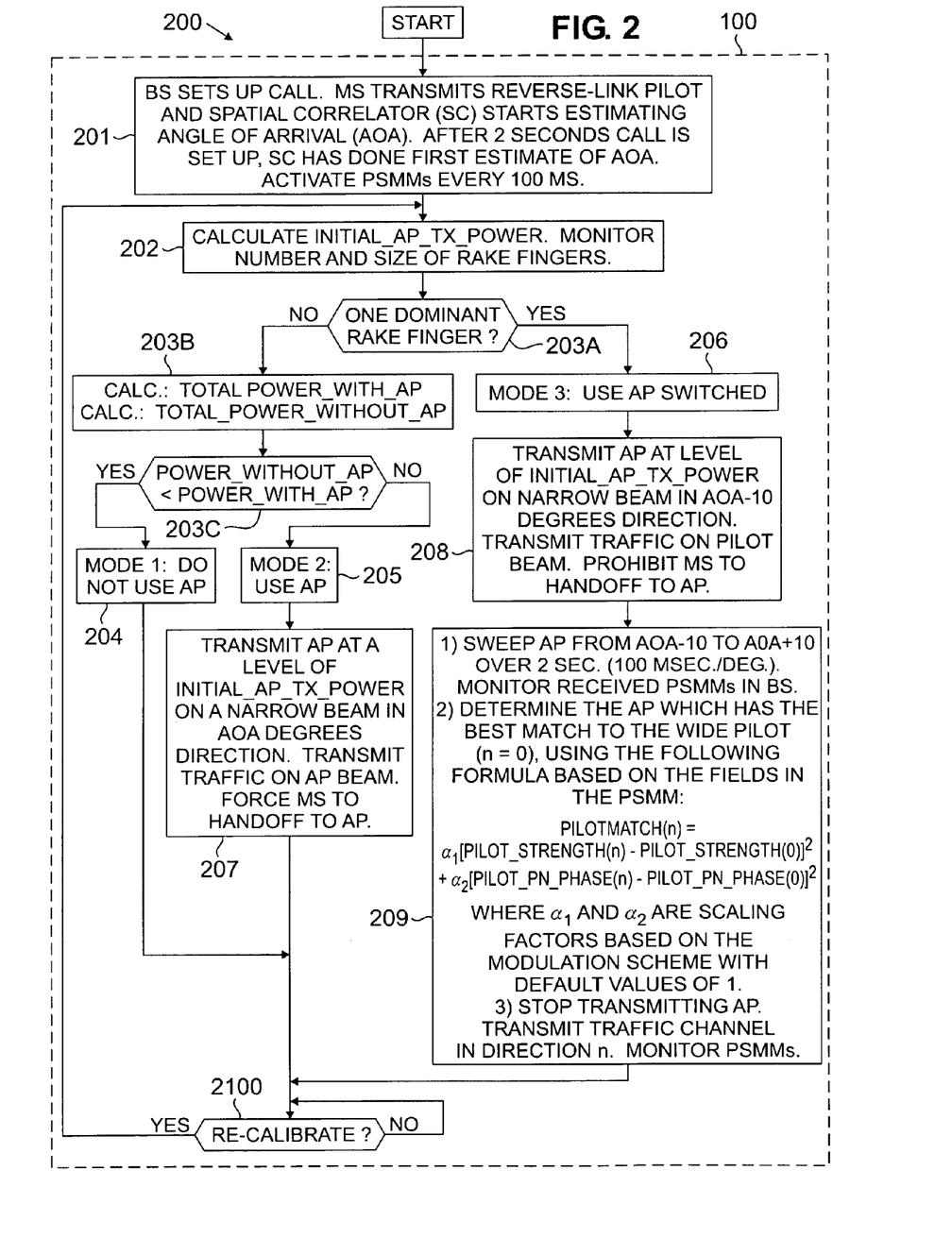
FIG. 2 is a flow diagram illustrating the use of an Auxiliary Pilot channel signal according to the principles of the present invention.

FIG. 2 depicts flow diagram 200, which illustrates the use of an Auxiliary Pilot channel signal according to the principles of the present invention. It is noted that there is an inverse relationship between the rate of PSMM messages (which load the reverse channel) and the length of time that the Auxiliary Pilot signal has to be on (loading the forward channel). It is expected that where the spatial correlator (SC) is accurate (e.g., when the mobile is far from the BTS or in a low-density area), the FIG. 2 procedures do not need to be repeated after call setup. Alternatively, if the channel changes too quickly, the base station either switches traffic to wide beam (switches to Mode 1), or permanently uses the Auxiliary Pilot channel signal (switches to Mode 2) and allows the mobile station to handoff to the Auxiliary Pilot.

In the example of FIG. 2, the mode is selected at process steps 203A, 203B and 203C, using the exemplary mode selection procedures described above. If Mode 2 is selected at process step 205, then Mode 2 is implemented at process step 207. In order to implement Mode 2, the base station starts transmitting the AP on a narrow beam in AOA degrees direction, and at a previously calculated level of initial AP transmit power (see also Initial_AP_TX_Power at process step 202). Then, the base station begins transmitting traffic on the AP beam, and forces the mobile station to hand off to the AP.

If Mode 3 is selected at process step 206, then Mode 3 is implemented at process steps 208 and 209. Mode 3 is implemented by first starting to transmit AP on a narrow beam in AOA −10 degrees direction (in this example), and at the previously calculated level of initial AP transmit power (see also Initial_AP_TX_Power at process step 202). The base station also transmits traffic on the sector pilot beam, and prohibits the mobile station from handing off to AP. At process step 209, the base station sweeps AP from AOA−10 degrees to AOA+10 degrees over a period of 2 seconds (100 milliseconds per degree in this example).

Monitoring the incoming PSMM messages, the base station can determine which AP provides the best match to the wide (sector) pilot. In particular, information from the received PSMM messages (PILOT_STRENGTH and PILOT_PN_PHASE) can be used to find the AP pilot that best matches the strongest multi-path associated with the sector pilot. With reference to where the parameter "n" is shown to take the value "0" at process step 209 in FIG. 2, this designates the strongest multi-path of the wide pilot. The remaining values of n designate the strength and phase measurements associated with the various angular directions assumed by the auxiliary pilot as it sweeps through the aforementioned angular distance. The AP that produces the smallest value of PilotMatch(n) at process step 209 is selected as the best match to the aforementioned strongest multi-path component of the wide pilot. As shown at process step 209 in FIG. 2, PilotMatch (n) provides a measure (in this example, a least squares approximation) of how closely the measured strength and phase of the nth AP signal compare to those same parameters of the strongest multi-path component of the sector (wide) pilot. Once the best-matching AP has been determined, transmission of the AP is terminated, and normal traffic channel transmission begins in the direction of that best AP match.

Examples of criteria (i.e., the calibration criteria at process step 2100 in FIG. 2) based on which the procedures in FIG. 2 could be repeated after call setup are as follows: 1) the DGU power increases substantially; 2) the PMRM reports excessive errors; 3) the SC detects a change in direction of more than 5 degrees; and 4) a change in the PSMM messages (Pilot_Strength and/or Pilot_PN_Phase) of the current pilot.

Figure 3:
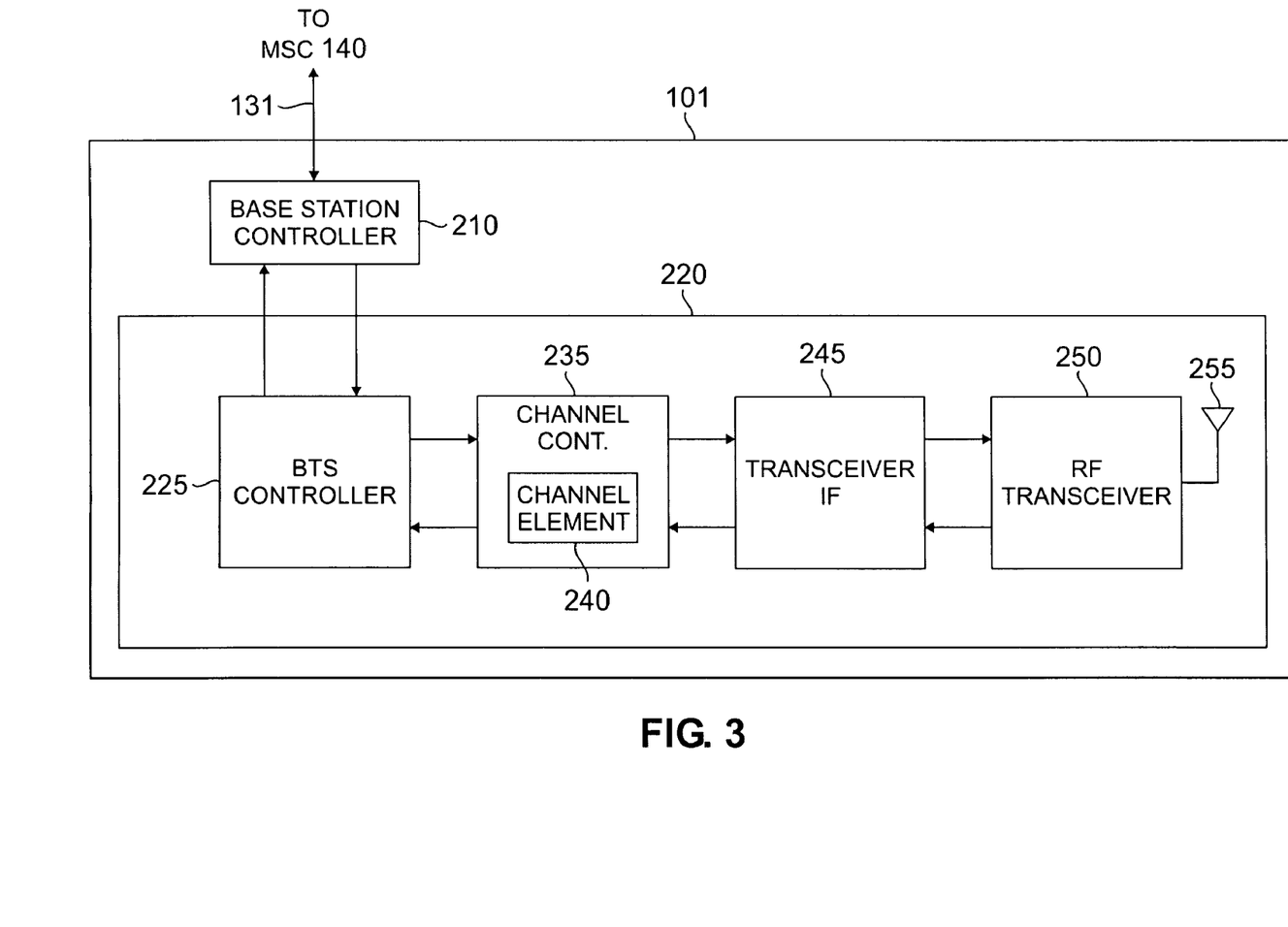
FIG. 3 illustrates an exemplary base station according to one embodiment of the present invention.

FIG. 3 illustrates exemplary base station 101 in greater detail according to an exemplary embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A forward channel refers to outbound signals from the base station to the mobile station and a reverse channel refers to inbound signals from the mobile station to the base station. Transceiver IF 245 transfers the bi-directional channel signals between channel controller 240 and RF transceiver unit 250.

BTS controller 225 also controls beam-forming operations in antenna array 255 according to the principles of the present invention. In an exemplary embodiment, BTS controller 225 performs the AP mode selection operation illustrated in FIG. 2. BTS controller 225 receives the measured AP signal parameters and monitors the RAKE finger measurements as described in FIG. 2. BTS controller 225 also performs the mode selection algorithm set form in FIG. 2.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, transceiver 250 may contain an antenna selection unit to select among different antennas in antenna array 255 during both transmit and receive operations.

Figure 4:
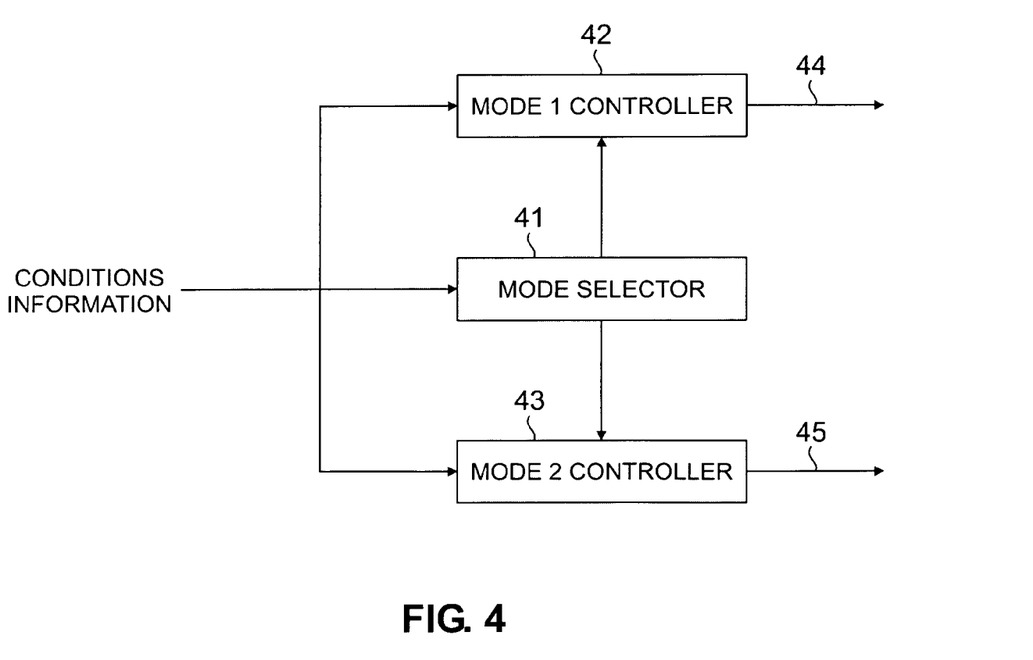
FIG. 4 illustrates a selected portion of the exemplary base station in FIG. 3 in more detail according to an exemplary embodiment of the invention.

FIG. 4 diagrammatically illustrates pertinent portions of exemplary BTS controller 225 of FIG. 3. In FIG. 4, mode selector 41 may enable either Mode 1 controller 42 or Mode 2 controller 43 based on current conditions in the system. In one embodiment, mode selector 41 may select between Modes 1 and 2 based on the exemplary Mode 1/Mode 2 selection criteria described above and illustrated generally at process steps 203A through 206 in FIG. 2. In another embodiment, Mode 1 controller 42 may implement the exemplary Mode 1 operations described above and illustrated generally at process step 207 in FIG. 2. Mode 2 controller 43 may implement the exemplary Mode 2 operations described above and illustrated generally at process steps 208 and 209 in FIG. 2.

Each of mode selector 41 and mode controllers 42 and 43 receive and operate in response to appropriate input information indicative of current conditions in the system (e.g., AOA, PSMMs, RAKE information, etc.). Mode controllers 42 and 43 provide respective output signaling 44 and 45 which direct the operation of other conventional base station components (not explicitly shown in FIG. 4) in order to effectuate the desired operation.

The present invention is more accurate than the prior art techniques for making direction finding estimates, since the mobile station takes the measurements directly from the forward link. The ON/OFF mechanism for the AP signal in Mode 3 has a relatively minor cost in terms of power, while maintaining a good phase reference and without any modification to the mobile station.

Although the present invention has been described with an exemplary embodiment, various changes and modifications may be suggested to one skilled in the art.

What is claimed is:

1. For use in a wireless network comprising a plurality of base stations capable of communicating with a plurality of mobile stations in a coverage area of said wireless network, a beam-forming apparatus associated with a first of said plurality of base stations comprising:
    a controller configured to, when a few rake fingers are monitored and one dominant rake finger exists, select a switched auxiliary pilot (AP) mode among a plurality of modes, receive from a first of said plurality of mobile stations first information about a first pilot signal comprising a sector pilot signal transmitted in a forward channel by said first base station and having a first antenna beam pattern, receive from said first mobile station second information about a second pilot signal comprising an auxiliary pilot signal transmitted in the forward channel by said first base station and having a second antenna beam pattern that is substantially narrower than said first antenna beam pattern, and use said information about said first and second pilot signals to estimate a direction for a beam-formed transmission to said first mobile station,
    wherein the plurality of modes comprises at least a non-AP mode in which no auxiliary pilot signal is used, a continuous AP mode in which at least one auxiliary pilot signal is used such that a mobile station hands off to the at least one auxiliary pilot signal, and the switched AP mode in which the sector pilot signal and the auxiliary pilot signal are used such that the mobile station does not hand off to the auxiliary pilot signal.

2. The beam-forming apparatus as set forth in claim 1, wherein said first information comprises strength and phase measurements associated with said first pilot signal and said second information comprises strength and phase measurements associated with said second pilot signal.

3. The beam-forming apparatus as set forth in claim 2, wherein said strength and phase measurements associated with said second pilot signal are measured in said first mobile station and transmitted to said first base station.

4. The beam-forming apparatus as set forth in claim 3, wherein said first information associated with said first pilot signal comprises information associated with each of a plurality of multi-path components of said first pilot signal and wherein said controller determines a strongest of said multi-path components of said first pilot signal based on said information associated with said multi-path components.

5. The beam-forming apparatus as set forth in claim 4, wherein said controller compares said information about said second pilot signal to said information associated with said strongest multi-path component of said first pilot signal.

6. The beam-forming apparatus as set forth in claim 5, wherein said first base station transmits a plurality of further pilot signals having respective antenna beam patterns that are all substantially narrower than said first antenna beam pattern, and wherein said controller receives further information about each of said further pilot signals and compares said further information about each of said further pilot signals to said information associated with said strongest multi-path component of said first pilot signal.

7. The beam-forming apparatus as set forth in claim 6, wherein said controller determines which of said information about said second and further pilot signals most closely matches said information associated with said strongest multi-path component of said first pilot signal.

8. The beam-forming apparatus as set forth in claim 7, wherein said controller generates a beam-formed transmission from said first base station to said first mobile station in a beam direction associated with one of said second and further pilot signals whose associated information most closely matches the information associated with said strongest multi-path component of said first pilot signal.

9. A wireless network comprising: a plurality of base stations capable of communicating with a plurality of mobile stations in a coverage area of said wireless network;
    and a beam-forming apparatus associated with a first of said plurality of base stations comprising:
    a controller configured to, when a few rake fingers are monitored and one dominant rake finger exists, select a switched auxiliary pilot (AP) mode among a plurality of modes, receive from a first of said plurality of mobile stations first information about a first pilot signal transmitted comprising a sector pilot signal in a forward channel by said first base station and having a first antenna beam pattern, receive from said first mobile station second information about a second pilot signal comprising an auxiliary pilot signal transmitted in the forward channel by said first base station and having a second antenna beam pattern that is substantially narrower than said first antenna beam pattern, and use said information about said first and second pilot signals to estimate a direction for a beam-formed transmission to said first mobile station,
    wherein the plurality of modes comprises at least a non-AP mode in which no auxiliary pilot signal is used, a continuous AP mode in which at least one auxiliary pilot signal is used such that a mobile station hands off to the at least one auxiliary pilot signal, and the switched AP mode in which the sector pilot signal and the auxiliary pilot signal are used such that the mobile station does not hand off to the auxiliary pilot signal.

10. The wireless network as set forth in claim 9, wherein said first information comprises strength and phase measurements associated with said first pilot signal and said second information comprises strength and phase measurements associated with said second pilot signal.

11. The wireless network as set forth in claim 10, wherein said strength and phase measurements associated with said second pilot signal are measured in said first mobile station and transmitted to said first base station.

12. The wireless network as set forth in claim 11, wherein said first information associated with said first pilot signal comprises information associated with each of a plurality of multi-path components of said first pilot signal and wherein said controller determines a strongest of said multi-path components of said first pilot signal based on said information associated with said multi-path components.

13. The wireless network as set forth in claim 12, wherein said controller compares said information about said second pilot signal to said information associated with said strongest multi-path component of said first pilot signal.

14. The wireless network as set forth in claim 13, wherein said first base station transmits a plurality of further pilot signals having respective antenna beam patterns that are all substantially narrower than said first antenna beam pattern, and wherein said controller receives further information about each of said further pilot signals and compares said further information about each of said further pilot signals to said information associated with said strongest multi-path component of said first pilot signal.

15. The wireless network as set forth in claim 14, wherein said controller determines which of said information about said second and further pilot signals most closely matches said information associated with said strongest multi-path component of said first pilot signal.

16. The wireless network as set forth in claim 15, wherein said controller generates a beam-formed transmission from said first base station to said first mobile station in a beam direction associated with one of said second and further pilot signals whose associated information most closely matches the information associated with said strongest multi-path component of said first pilot signal.

17. For use in a base station of a wireless network, a method of beam-forming a forward channel signal between the base station and a mobile station, the method comprising:

selecting a switched auxiliary pilot (AP) mode among a plurality of modes when a few rake fingers are monitored and one dominant rake finger exists;

transmitting in a forward channel from the base station a first pilot signal comprising a sector pilot signal and having a first antenna beam pattern;

transmitting in the forward channel from the base station a second pilot signal comprising an auxiliary pilot signal and having a second antenna beam pattern which is substantially narrower than said first antenna beam pattern; in the base station, receiving from the mobile station first information about the first pilot signal and second information about the second pilot signal; and in the base station, using the first information and the second information to estimate a direction for a beam-formed transmission from the base station to the mobile station, wherein the plurality of modes comprises at least a non-AP mode in which no auxiliary pilot signal is used, a continuous AP mode in which at least one auxiliary pilot signal is used such that a mobile station hands off to the at least one auxiliary pilot signal, and the switched AP mode in which the sector pilot signal and the auxiliary pilot signal are used such that the mobile station does not hand off to the auxiliary pilot signal.

18. The method as set forth in claim 17, wherein the first information comprises strength and phase measurements associated with the first pilot signal and the second information comprises strength and phase measurements associated with the second pilot signal.

19. The method as set forth in claim 18, wherein the strength and phase measurements associated with the second pilot signal are measured in the mobile station and transmitted to the base station.

20. The method as set forth in claim 19, wherein the first information associated with the first pilot signal comprises information associated with each of a plurality of multi-path components of the first pilot signal and further comprising the step of determining a strongest of the multi-path components of the first pilot signal based on the information associated with the multi-path components.

21. The method as set forth in claim 20, further comprising comparing the information about the second pilot signal to information associated with the strongest multi-path component of the first pilot signal.

* * * * *